(12) United States Patent
Dixon et al.

(10) Patent No.: US 6,439,222 B1
(45) Date of Patent: Aug. 27, 2002

(54) RAPID ASSEMBLY BARBECUE GRILL AND CART

(75) Inventors: Bill Dixon, Columbus, GA (US); Lewis Dorsey Cox, Leeds; Lloyd G. B. Cooper, Birmingham, both of AL (US)

(73) Assignee: W.C. Bradley Company, Columbus, GA (US)

( * ) Notice: Subject to any disclaimer, the term of this patent is extended or adjusted under 35 U.S.C. 154(b) by 0 days.

(21) Appl. No.: 09/927,108

(22) Filed: Aug. 10, 2001

(51) Int. Cl.[7] .................................................. F24C 3/00
(52) U.S. Cl. ........................ 126/41 R; 126/50; 126/276; 126/305 R; 248/129; 248/188.6; 248/250; 248/439
(58) Field of Search ............................... 126/25 R, 276, 126/41 R, 304 R, 305, 304 A; 108/108; 248/188.6, 250, 129, 439

(56) References Cited

U.S. PATENT DOCUMENTS

| | | | | |
|---|---|---|---|---|
| 4,063,703 A | * | 12/1977 | Shy ........................ 126/304 A |
| 5,104,080 A | * | 4/1992 | Berger ........................ 248/250 |
| 5,323,758 A | * | 6/1994 | Minshall ................... 126/41 R |
| 5,406,894 A | * | 4/1995 | Herrmann et al. .......... 248/250 |
| 5,640,949 A | * | 6/1997 | Smith ......................... 126/276 |
| 5,941,229 A | * | 8/1999 | Schlosser et al. ......... 126/41 R |
| 5,979,431 A | * | 11/1999 | Hamilton et al. ......... 128/41 R |
| 6,257,229 B1 | * | 7/2001 | Stewart et al. ............. 126/276 |

* cited by examiner

Primary Examiner—James C. Yeung
(74) Attorney, Agent, or Firm—James W. Kayden; Thomas, Kayden, Horstemeyer & Risley, LLP

(57) ABSTRACT

A barbecue grill and cart including a right leg frame assembly and a left leg assembly. Each of the right and left leg assemblies includes a bracket member disposed on an upper portion of the right and said left leg assemblies. Each of the bracket members includes a contact portion for engaging a barbecue grill when the right and left leg assemblies are in generally vertical positions. Securing means are provided for rotatably attaching the right and said left leg assemblies to the barbecue grill such that the right and said left leg assemblies can be rotated between a stowed position and said generally vertical position.

14 Claims, 4 Drawing Sheets

RAPID ASSEMBLY BARBECUE GRILL AND CART

FIELD OF THE INVENTION

The present invention generally relates to the field of barbecue grills and, more particularly, to a rapidly assembled, foldable cart for supporting a barbecue grill.

BACKGROUND OF THE INVENTION

Commonly, barbecue grills are not assembled when they are purchased. This makes commercial sense in that each barbecue grill requires less space during shipping and storing, meaning more units can be transported in each shipment, thereby saving money for both the manufacturer and the retailer of the barbecue grill. This also provides for easier transportation of the barbecue grill from the retailer by the purchaser. However, this also results in a number of potential problems. The purchaser has to either partially or fully assemble the barbecue grill prior to use. This could require added expense and possibly significant time on the part of the purchaser. For example, should the purchaser not already possess the tools required to assemble the barbecue grill, the purchaser will have to either purchase or borrow them. As well, quite frequently, the assembly of the barbecue grill may be beyond the mechanical acumen of the purchaser, thereby causing frustration and reduced consumer satisfaction in the overall product.

Furthermore, assembly by the purchaser increases both the chances of parts being lost during assembly and the potential that the barbecue grill will be improperly assembled. Lost parts can lead to lost time and extra effort on the part of both the purchaser and the manufacturer. First, the purchaser must secure another part before assembly can be completed and the barbecue grill used. Hopefully, the missing part is in the retailer's stock system so that the part may be rapidly replaced. However, in all likelihood, the part will have to be procured from the manufacturer, leading to lengthy delays in the use of the barbecue grill. Second, because the grill is brand new, the purchaser will likely believe the missing part was not originally provided. Therefore, the manufacturer, in all likelihood, will have to replace the part free of charge. Worse yet, should the barbecue grill be assembled either without all of the required parts, or just improperly, safety concerns arise, such as the barbecue grill being unstable; improper gas train assembly causing a fire hazard; etc.

Once assembled, typical grills are somewhat cumbersome and therefore hard to transport. Although numerous portable grills do exist, they tend to be smaller than standard grills, and therefore have smaller cooking surfaces. It is therefore desirable to have a full size grill that is fairly easy to transport, while at the same time not requiring excessive disassembly.

Therefore, there is a need for providing grills having improved grill carts that address these and other shortcomings of the prior art.

SUMMARY OF THE INVENTION

An embodiment of the barbecue grill and cart includes a right leg frame assembly and a left leg assembly. Each of the right and left leg assemblies includes a bracket member disposed on an upper portion of the right and said left leg assemblies. Each of the bracket members includes a contact portion for engaging a barbecue grill when the right and left leg assemblies are in generally vertical positions. Securing means are provided for rotatably attaching the right and said left leg assemblies to the barbecue grill such that the right and said left leg assemblies can be rotated between a stowed position and said generally vertical position.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed upon clearly illustrating the principles of the present invention.

Figure 1:
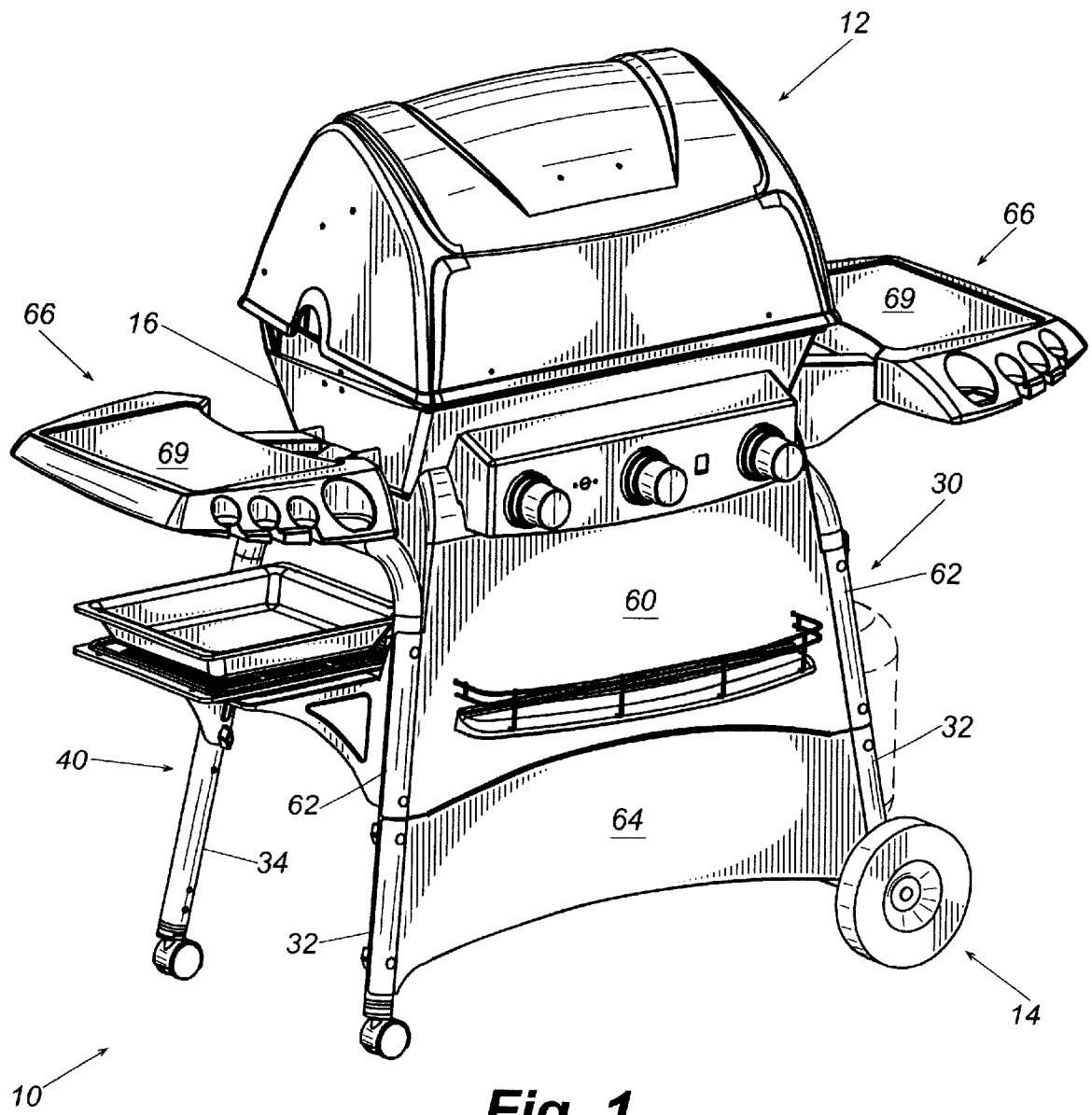
FIG. 1 is a perspective view of the present barbecue grill cart assembly, shown here in completely assembled form with a barbecue grill supported thereby.

Reference will now be made in detail to the description of the barbecue grill and cart as illustrated in the drawings. While the barbecue grill and cart will be described in connection with these drawings, there is no intent to limit it to the embodiment or embodiments disclosed therein. On the contrary, the intent is to cover all alternatives, modifications and equivalents included within the spirit and scope of the barbecue grill and cart as defined by the appended claims.

DETAILED DESCRIPTION OF THE PREFERRED EMBODIMENT

Figure 4:
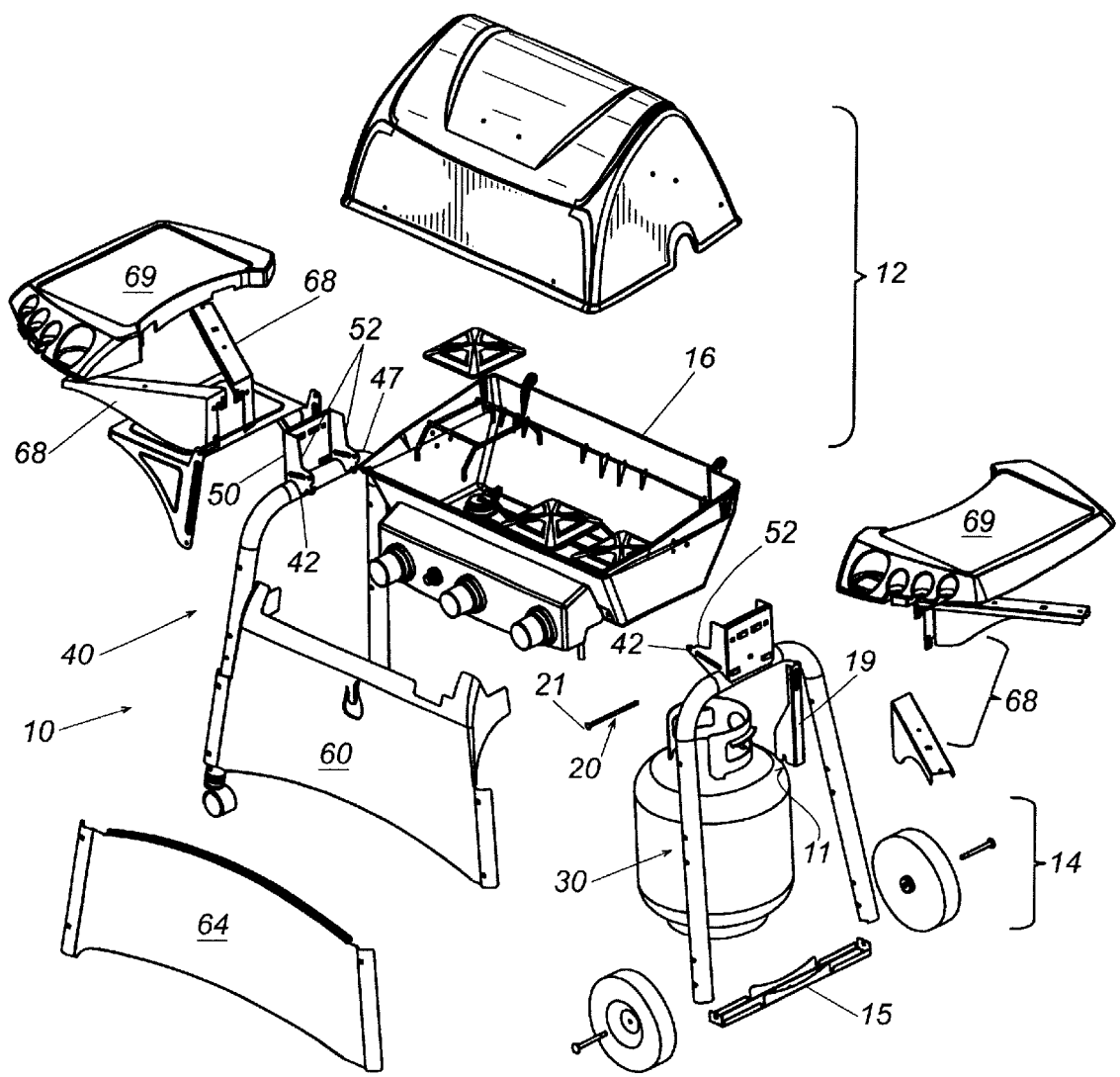
FIG. 4 is an exploded, perspective view of the present barbecue grill cart and barbecue grill supported thereby.

Referring now more specifically to the drawings, and to FIGS. 1 and 4 in particular, numeral 10 designates generally the present barbecue grill cart, shown here supporting a barbecue grill 12. The barbecue grill cart 10 includes two generally identical leg assemblies, thus facilitating manufacturing. The major difference between the right leg assembly 30 and the left leg assembly 40 is the provision of a wheel assembly 14 on the right leg assembly 30, as well as the fact that the right leg assembly 30 is configured to support an LP gas tank (shown in dotted lines).

Figure 2:
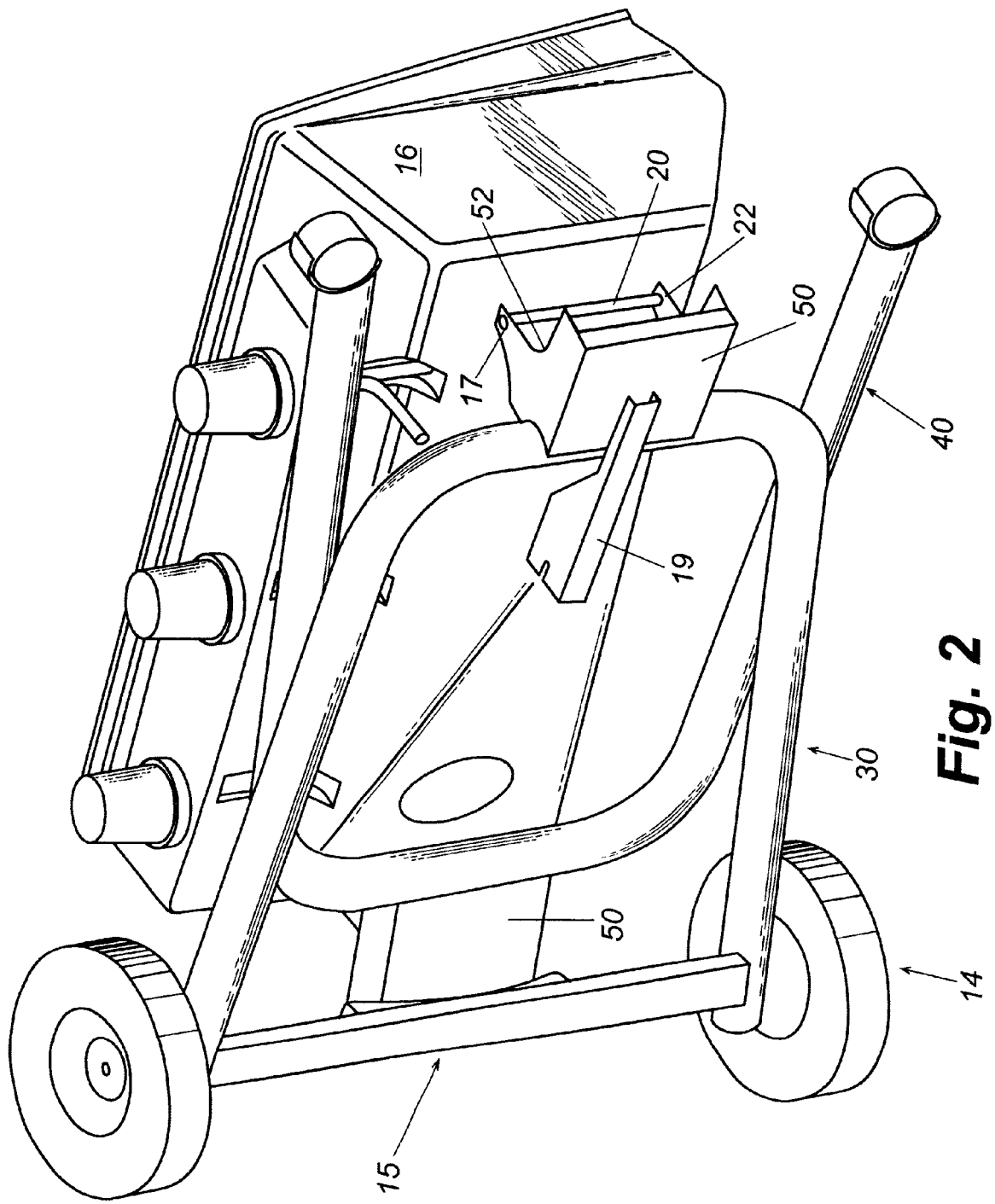
FIG. 2 is a partial, perspective view of the present barbecue grill cart assembly, partially assembled, with the leg assemblies in the stowed position.

The right and left leg assemblies 30, 40 each include a bracket member 50 attached to their upper portion, the bracket members 50 being used to rotatably attach the right and left leg assemblies 30, 40 to the lower casting 16 of the barbecue grill. Each bracket member 50 includes at least one and preferably a plurality of tabs having orifices 42 configured to substantially align with at least one and preferably a plurality of appendages having orifices 17 (FIG. 2) disposed in the lower casting 16 of the barbecue grill 12. After the orifices 42 and 17 have been aligned, suitable securing means are passed through the orifices 42, 17 and secured in place. As shown in FIGS. 2 and 4, a longitudinal pin 20 having an enlarged head 21 on one end is used, the head 21 size being greater than that of the orifices 17 and 42. Suitable holding means are placed on the distal end 22 of the longitudinal pin 20 to keep the longitudinal pin 20 in place. For example, the distal end 22 can include a hole configured to receive a cotter key. In an alternate embodiment, a longitudinal pin 20 configured to receive a cotter key on both ends can be used, or the longitudinal pin 20 as shown, can be configured to receive a threaded fastener on the end opposite the enlarged head 21 to secure the bracket members, and consequently the leg assemblies, to the grill casting.

Preferably, the right and left leg assemblies 30, 40 are attached prior to shipment by the manufacturer thereby facilitating assembly by the purchaser. During shipment, the right and left leg assemblies 30, 40 are placed in a stowed position as shown in FIG. 2. This position also proves useful any time it is desired to transport the barbecue grill 12. To assemble the grill cart 12, the right and left leg assemblies 30, 40 are rotated so that each leg of both the right and left leg assemblies 30, 40 is moved from the nested position shown in FIG. 2 to the operative position shown in FIGS. 1 and 4. Both the right and left leg assemblies 30, 40 each contain a front leg 32 and a back leg 34. The right and left leg assemblies 30, 40 are secured in operative position by attaching an upper panel 60 to either the front legs 32 or the back legs 34. As shown, the upper panel 60 includes flange means 62 at both ends, and is secured to the front legs 32 by fastening means, at least one each extending through each flange means 62 and each associated front leg 32. Suitable fastening means (not shown) include a threaded bolt and a threaded wing nut, configured to be tightened by hand. A regular threaded nut, in addition to other means, may also be employed. In the embodiment shown, a second, lower panel 64 is similarly attached to the front legs 32, this lower panel being optional.

Figure 3:
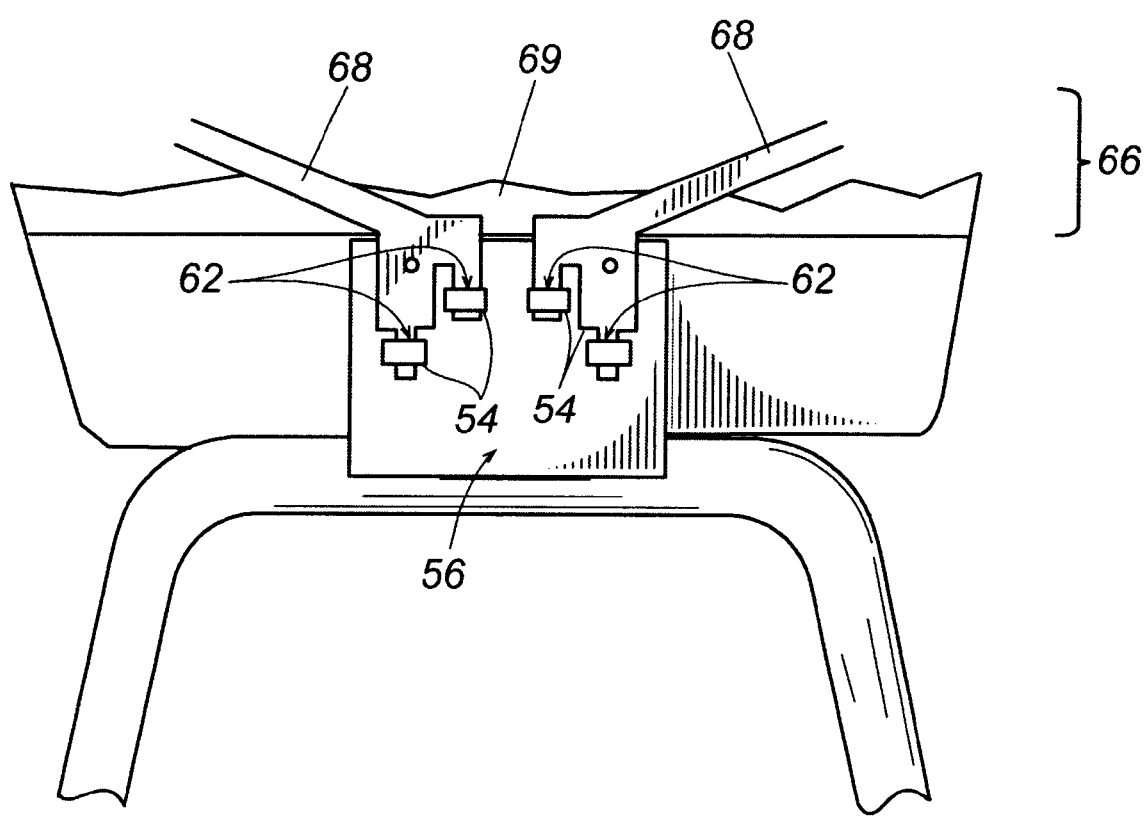
FIG. 3 is an partial, fragmentary, side elevational view detailing the attachment system for the connection of the side shelves to the leg assemblies.

To help insure the stability of the barbecue grill, each bracket member 50 includes a contact portion 52. Ideally, the contact portion 52 is contoured to match the shape of the lower casting 16 where contact is made by the bracket members 50. Referring now to FIG. 3, each bracket member 50 further includes a plurality of slots 54 formed in an outer surface 56 to facilitate the attachment of side shelf assemblies 66 to the barbecue grill cart 12. When the right and left leg assemblies 30, 40 are substantially vertical, the outer surface 56 of each bracket member 50 is similarly positioned. The longitudinal axis of each of the slots 54 is substantially vertical, and the slots 54 are configured to receive fingers 67 that extend downwardly from the shelf assembly 66.

To attach a shelf assembly 66 to a bracket member 50, the downwardly extending fingers 67 are inserted in the corresponding slots 54. For added strength, a threaded bolt and fastener (not shown) can be passed through both the bracket member 50 and one of the frame members 68. Although various shapes are envisioned for the fingers 67, blade-like fingers and slots with a slightly larger width than the fingers are preferable from an ease of manufacturing standpoint. For added flexibility, the fingers 67 are disposed on frame members 68 that are then attached to a shelf 69. This permits the frame members 68 to be used with any number of different shelves and/or other attachments. Although two frame members 68 per shelf assembly 66 are shown as preferable, once again from an ease of manufacturing standpoint, it is contemplated that a single frame member 68 having the required number of fingers 67 could be used.

A wheel assembly 14 (FIGS. 2 and 4) is provided including a strut member 15 extending along the longitudinal axis of the wheel assembly 14. The strut member 15 is configured to receive the bottom portion of an LP tank and is rotatably secured about the longitudinal axis. This permits the strut member 15 to be rotated to one side to receive an LP tank and then rotated back such that the tank is vertical. The tank is further secured in place by an engaging member 19 that is slidably attached to a bracket member 50. The engaging member 19 extends downwardly and includes a slot 11 configured to receive the top lip of the LP tank. Because the engaging member 19 is slidably attached to the bracket member 50, by means of a longitudinal slot in the engaging member 19 and fastening means passing therethrough, it can be adjusted to accommodate various sized tanks prior to being secured in place. Ideally, a threaded bolt and wing nut is used to secure the engaging member 19 in place.

The foregoing description has been presented for purposes of illustration and description. It is not intended to be exhaustive or to limit the invention to the precise forms disclosed. Obvious modifications or various are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A barbecue grill cart assembly for receiving a barbecue grill comprising:

a right leg assembly and a left leg assembly, each of said right and left leg assemblies including a front leg, a rear leg, and a bracket member disposed on an upper portion of said right and said left leg assemblies, each of said bracket members including at least one tab for engaging a corresponding appendage on the barbecue grill when said right and left leg assemblies are in a generally vertical position;

securing means disposed through said tab and said appendage for rotatably securing said right and said left leg assemblies to the barbecue grill such that said right and said left leg assemblies can be rotated between a stowed position and; said generally vertical position and wherein at least one of said bracket members further includes an outer surface, said outer surface being disposed in a substantially vertical plane when said right and said left leg assemblies are in said generally vertical position, said outer surface including a plurality of slots, and a shelf assembly with a plurality of downwardly extending fingers when said outer surface is disposed in said substantially vertical plane.

2. The barbecue grill cart of claim 1, wherein said shelf assembly includes said plurality of downwardly extending fingers, and said shelf assembly is secured in a horizontal plane by disposing said plurality of downwardly extending fingers through said plurality of slots.

3. The barbecue grill cart of claim 2, wherein each of said plurality of downwardly extending fingers is blade shaped.

4. The barbecue grill cart of claim 3, wherein said plurality of downwardly extending fingers further comprises an upper pair and a lower pair of downwardly extending fingers.

5. The barbecue grill cart of claim 1 in which said bracket members include contact portions for engaging the barbecue grill for adding stability to the cart assembly.

6. The barbecue grill cart of claim 1, wherein said right and said left leg assemblies are further secured in said substantially vertical position by an upper panel, said panel including outwardly extending flange means for engaging said right and said left leg assemblies.

7. The barbecue grill cart of claim 6, wherein each of said flange means includes at least one orifice, each of said right and left leg assemblies includes at least one corresponding orifice, and fastening means for securing said panel to said right and said left leg assemblies pass through said orifices.

8. The barbecue grill cart of claim 1 wherein each of said bracket members includes a first plurality of orifices, said securing means further comprising a longitudinal member extending through said first plurality of orifices and a second corresponding plurality of orifices disposed on the barbecue grill, wherein a first end of said longitudinal member includes an enlarged head such that said enlarged head will not pass through said first plurality of orifices and a second end configured to receive a fastening device.

9. The barbecue grill cart of claim 8 wherein said second end is threaded and said fastening device is a threaded fastener.

10. The barbecue grill of claim 8, wherein said second end includes a hole for receiving a cotter key.

11. A barbecue grill cart assembly including a right leg assembly, a left leg assembly, at least one bracket member being configured to attach one of said leg assemblies to a barbecue grill, said bracket member including an outer surface, said outer surface being disposed in a substantially vertical plane, a shelf assembly having a plurality of downwardly extending fingers, a plurality of slots disposed in said outer surface, and wherein said plurality of slots is configured to receive said plurality of downwardly extending fingers, thereby securing said shelf assembly to said barbecue grill cart assembly.

12. The barbecue grill cart assembly of claim 11, wherein each of said plurality of downwardly extending fingers is blade shaped.

13. The barbecue grill cart assembly of claim 12, wherein said plurality of slots further comprises an upper pair of slots and a lower pair of slots, said upper pair of slots being disposed between a first and a second slot of said lower pair of slots.

14. The barbecue grill cart assembly of claim 11, wherein said at least one bracket member further includes a right bracket member and a left bracket member, each of said bracket members being configured to rotatably attach said right leg assembly and said left leg assembly, respectively, to said barbecue grill.

* * * * *